United States Patent [19]

Frankhouse et al.

[11] Patent Number: 4,694,705
[45] Date of Patent: Sep. 22, 1987

[54] MOLDED TERMINAL FOR REMOTE CONTROL ASSEMBLY (LOLLIPOP)

[75] Inventors: Thomas J. Frankhouse, Southfield; Arthur L. Spease, Livonia, both of Mich.

[73] Assignee: Teleflex Incorporated, Limerick, Pa.

[21] Appl. No.: 6,252

[22] Filed: Jan. 12, 1987

Related U.S. Application Data

[63] Continuation of Ser. No. 742,363, Jun. 7, 1985, abandoned, which is a continuation of Ser. No. 392,515, Jun. 28, 1982, abandoned.

[51] Int. Cl.$^4$ ................................................ F16C 1/14
[52] U.S. Cl. ...................................... 74/501 R; 74/502; 403/67; 403/141; 403/163
[58] Field of Search ............ 74/501 R, 501 D, 501 A, 74/501 F, 502; 403/67, 71, 76, 141, 122, 163

[56] References Cited

U.S. PATENT DOCUMENTS

| | | | |
|---|---|---|---|
| 2,589,060 | 11/1958 | Davies et al. | 403/122 |
| 3,006,673 | 10/1961 | Swick | 403/122 |
| 3,037,787 | 6/1962 | Gottschald | 403/76 X |
| 3,787,127 | 1/1974 | Cutler | 403/133 |
| 4,111,570 | 9/1978 | Morel | 403/141 X |
| 4,118,131 | 10/1978 | Schnitzius | 403/141 X |
| 4,327,600 | 5/1982 | Bennett | 74/501 R |

FOREIGN PATENT DOCUMENTS 2266064 3/1974 France ............................. 403/141

Primary Examiner—Gary L. Smith
Assistant Examiner—Rodney M. Lindsey
Attorney, Agent, or Firm—Reising, Ethington Barnard, Perry & Milton

[57] ABSTRACT

A motion-transmitting remote assembly (10) of the type for transmitting motion in a curved path including a tube member (14) and a rod member (18) movably supported by the tube member (14) and extending therefrom to provide a variable extending length of the rod member (18) between the tube member (14) and one end (68) of the rod member (18), the rod member (18) defining a line of force. An integral terminal member (20) operatively interconnects the extending length of the rod member (18) and a control member (22). The assembly is characterized by the terminal member (22) including an opening (38) therethrough defining an axis perpendicular to the line of force and having a containing portion for containing a body portion (32) of the control member (22) therein and a retaining portion for retaining a ball pin (36) extending from the body portion (32) of the control member (22) therein. The retaining portion includes a plurality of flexible fingers (50) defining the retaining portion of the opening (38) for engaging and retaining the ball pin (36) disposed within the opening (38).

13 Claims, 7 Drawing Figures

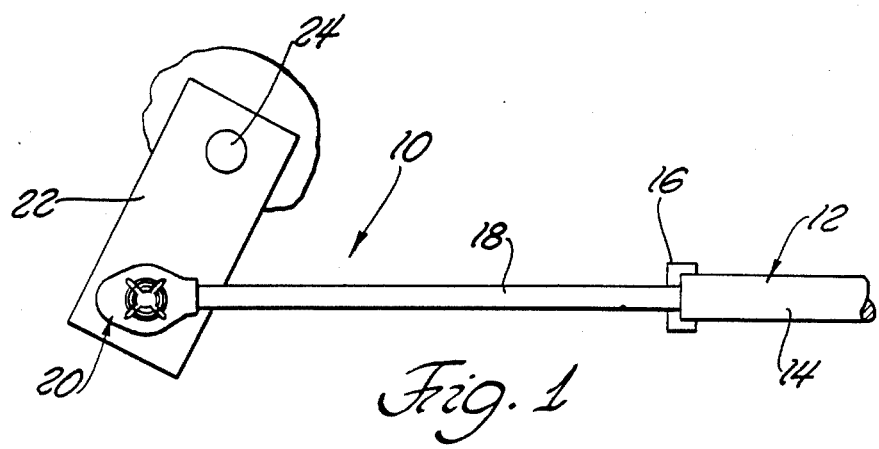
Fig. 1
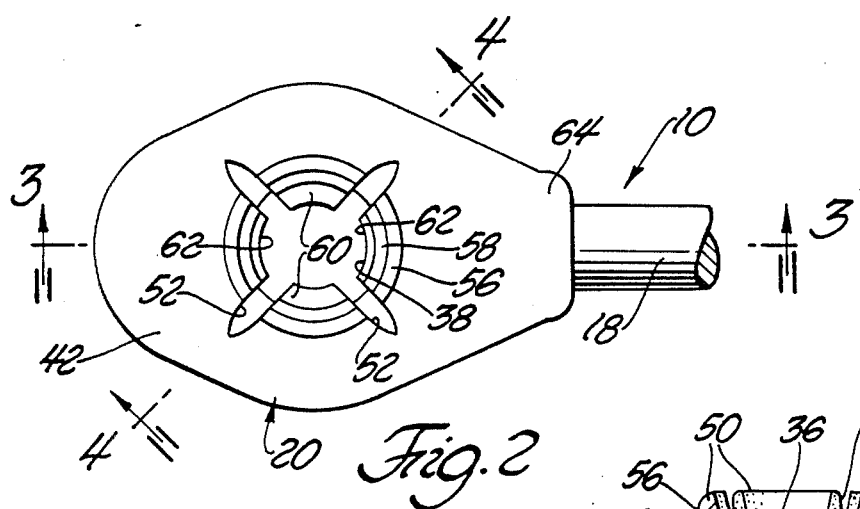
Fig. 2
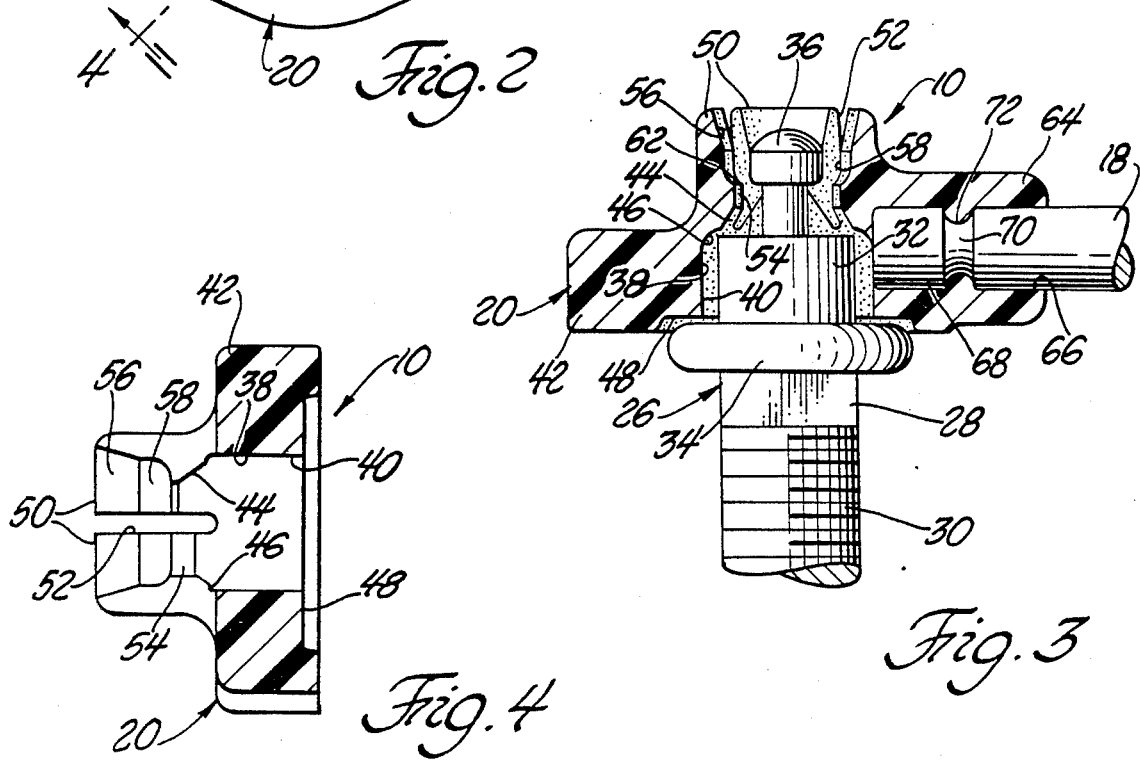
Fig. 3
Fig. 4

MOLDED TERMINAL FOR REMOTE CONTROL ASSEMBLY (LOLLIPOP)

This application is a continuation of application Ser. No. 742,363, filed 6-7-85 which, in turn is a 1.62 continuation of U.S. Ser. No. 392,515 filed 6-28-82 now both abandoned.

TECHNICAL FIELD

The instant invention relates to a motion transmitting remote control assembly of the type for transmitting motion in a curved path.

BACKGROUND ART

Generally, push-pull or motion-transmitting remote control assemblies include a core element guided for linear reciprocating movement through a flexible conduit. A terminal member or connector interconnects the core element and a control member, such as a lever. The lever may be an actuator of a throttle or transmission assembly. The type of connector may be dependent upon the specific use, such as with a throttle lever or other type of lever and it may also be dependent upon the availability of specific types of control members and the state of the art of various types of levers and the projections extending therefrom to which the terminal member is connected. For example, the U.S. Pat. No. 3,787,127 to Cutler discloses a motion-transmitting remote control assembly including a terminal member for snap-on attachment to a control member. A pocket is formed by a bearing insert and a casing. The pocket is adapted to retain a simple ball pin therein. Other shaped pockets have been adapted for other uses. Presently, transmission assemblies include control members having projections to be connected to the terminal member, the projections including a cylindrical body portion having a ball pin extending therefrom and an annular flange. The instant invention provides a terminal member for retaining such a projection extending from a control member.

STATEMENT OF INVENTION

According to the present invention, there is provided a motion-transmitting remote control assembly of the type for transmitting motion in a curved path including guide means and core means movably supported by the guide means and extending therefrom to provide a variable extending length of the core means between the guide means and one end of the core means. The extending length of the core means defines a line of force. An integral terminal member operatively interconnects the extending length of the core means and a control member. The assembly is characterized by the terminal member including an opening therethrough defining an axis perpendicular relative to the line of force and having containing means for containing a body portion of the control member therein and retaining means for retaining a ball pin extending from the body portion of the control member therein. The retaining means includes at least one flexible finger defining a portion of the opening for engaging and retaining the ball pin disposed within the opening.

FIGURES IN THE DRAWINGS

Other advantages of the present invention will be readily appreciated as the same becomes better understood by reference to the following detailed description when considered in connection with the accompanying drawings wherein:

FIG. 1 is a schematic elevational view of a motion-transmitting remote control assembly constructed in accordance with the instant invention;

FIG. 2 is an enlarged fragmentary plan view of the instant invention;

FIG. 3 is a cross-sectional view taken substantially along lines 3—3 of FIG. 2;

FIG. 4 is a cross-sectional view taken substantially along lines 4—4 of FIG. 2;

DETAILED DESCRIPTION OF THE DRAWINGS

Figure 5:
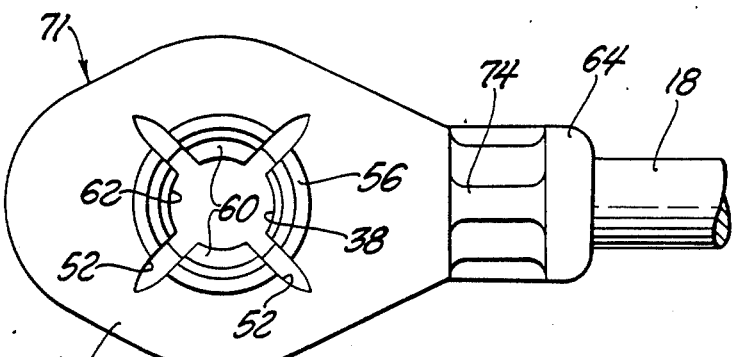
FIG. 5 is an enlarged plan view of a second embodiment of the instant invention.

A preferred embodiment of a motion-transmitting remote control assembly of the type for transmitting motion in a curved path is generally shown at 10 in FIGS. 1 through 4. In the several embodiments shown in the remaining figures, like numbers designate like or corresponding sections or parts.

The assembly 10 includes guide means generally indicated at 12. The guide means 12 includes a conduit (not shown) having an end portion connected to a rigid tube member 14. The tube member 14 may be connected to the conduit at a swivel joint thereby allowing swiveling movement of the tube member 14 relative to the conduit. A wiper member 16 is mounted on the end portion of the tube member 14. The assembly 10 further includes core means movably supported by the guide means 12 and extending therefrom to provide a variable length of the core means between the guide means 12 and one end of the core means. More specifically, the core means includes a flexible core element (not shown) disposed within the conduit for reciprocating linear movement therein. A rod member 18 is connected to an end portion of the conduit and extends from the tube member 14 to provide the variably extending length of the core means between the guide means 12 and the end of the rod member 18 extending from the tube member 14. The wiper 16 engages the rod member 18 to provide a seal thereabout to prevent the ingress of foreign particles into the tube member 14. The tube member 14 may be supported in a swivel joint (not shown), as is well-known in the art.

The assembly 10 includes an integral terminal member generally indicated at 20 in FIGS. 1 through 4 for operatively interconnecting the rod member 18 and a control member 22. The control member 22 may take the form of a lever 22 which is supported upon a rotatable actuating shaft 24. The rod member 18 defines a line of force whereby, upon longitudinal movement of the rod member 18 along the line of force defined thereby, the lever 22 is rotated which, in turn, rotates the actuating shaft 24. Hence, the terminal member 20 interconnects the rod member 18 and lever 22 so as to translate the linear movement of the core means into pivoting or rotational movement of the shaft 24 via the lever 22 and the terminal member 20 provides a pivoting connection of the rod member 18 to the lever 22. To accomplish this function, the control member 22 includes a projection generally indicated at 26 in FIG. 3. The projection 26 includes a neck portion 28 which may extend integrally from the lever 22 or may include a threaded portion 30 to be connected to a threaded bore in the lever 22. The projection 26 includes a cylindrical body portion 32 and a flange 34 disposed between the body portion 32 and neck 28. A ball pin 36 extends from the body portion 32.

The terminal member 22 includes an opening 38 extending therethrough and defining an axis perpendicular relative to the line of force as defined by the rod member 18. The opening 38 includes containing means for containing the body portion 32 of the lever 22 therein and retaining means for retaining the ball pin 36 extending from the body portion 32 of the lever 22 therein.

More specifically, the containing means includes a substantially cylindrical portion 40 of the opening 38 for containing the body portion 32 of the lever 22 therein and for absorbing the applied forces as the terminal member 22 is moved along the line of force. In other words, as the rod member 18 is actuated for reciprocating movement into and out of the tube member 14, the linear movement of the rod member 18 applies a force via the terminal member 20 to the lever 22, that force being perpendicular relative to the axis defined by the opening 38. The applied force, which is applied along the line of force defined by the rod member 18 and applied against the body portion 32 of the projection 26 extending from the lever 22, is absorbed by the cylindrical portion 40 of the opening 38. The terminal member 20 includes an enlarged body portion 42 which surrounds the cylindrical portion 40 of the opening 38 to absorb the applied forces.

The containing means further includes an annular inwardly tapering portion of the opening 38 between the cylindrical portion 40 and the retaining means of the opening 38. The inwardly tapering portion includes a frustoconical portion 44 adjacent to the retaining means and an annular inwardly curving portion 46 between the frustoconical portion 44 and the cylindrical portion 40 of the containing means. The containing means also includes abutment means for abutting the flange 34 extending from the body portion 32 of the projection 26 to retain the body portion 32 of the projection 26 below the curved portion 46. The abutment means includes a shoulder portion 48 disposed about a periphery of the opening 38 for abutting against the flange 34. By abutting against the flange 34, the shoulder 48 limits the extent to which the body portion 32 may enter the containing means of the opening 38.

The retaining means of the opening 38 includes a plurality of fingers 50 extending from the terminal member 20 and having an inner surface defining the retaining means of the opening 38. A plurality of slots 52 are formed between each of the fingers 50. Each of the slots 52 extend radially from the central axis of the opening 38 at an angle relative to the line of force defined by the rod member 18. In other words, none of the slots 52 are disposed on the line of force. Each of the slots 52 is disposed at an acute angle relative to the line of force. More specifically, the retaining means includes four slots 52, each of the slots 52 being disposed at an angle of about 45° relative to the line of force. The slots 52 extend completely through the retaining means of the terminal member 20. The slots 52 provide flexibility to the retaining means of the terminal member 20 by allowing for flexibility of the fingers 50 which engage the ball pin 36 of the projection 26. The slots 52 allow the fingers 50 to flex outwardly during the insertion of the ball pin 36 into the opening 38 defined by the inner surfaces of the fingers 50.

The retaining means of the opening 38 includes an inner surface having a cylindrical portion 54 adjacent to the inwardly tapering portion 44 of the containing means. The retaining means further includes a frustoconical outer portion 56 and an intermediate portion 58 disposed between the outer frustoconical portion 56 and inner cylindrical portion 54. The intermediate portion 58 has a longitudinally inwardly sloping surface which slopes towards the cylindrical portion 54 defining a circumferential edge therebetween. The circumferential edge is enlarged to form a major lip 60 extending inwardly from the circumferential edge for engaging the ball pin 36 of the projection 26 extending from the lever 22 disposed within the opening 38. The outward fingers 50 which are disposed on the line of force defined by the rod member 18 include a minor lip portion 62, the minor lip portion 62 being smaller than the major lip 60. As the ball pin 36 is inserted into the retaining means of the opening 38, the ball pin engages the lips 60 so as to bend the fingers 50 outwardly thereby allowing for the insertion of the ball pin 36 therebetween. The frustoconical portion 56 facilitates the insertion of the ball pin 36. As the ball pin 36 passes the lips 60, the fingers 50 flex inwardly to their original condition and the lips 60 engage the ball pins 36 so as to retain the ball pin 36 within the retaining means of the opening 38 and the body portion 32 of the projection 26 within the cylindrical portion 40 of the containing means of the opening 38.

The terminal member 20 includes a neck portion 64 extending radially outwardly relative to the axis defined by the opening 38. The neck portion 64 has a substantially cylindrical bore 66 therein being parallel to the line of force defined by the rod member 18, the rod member 18 having an end portion 68 retained within the bore 66 on a line parallel to the line of force. The rod member 18 includes an annular depression 70 about the end portion 68, the neck portion 64 including an annular projection 72 which is molded about the depression 70 so as to engage the end portion 68 of the rod member 18 thereby retaining the rod member 18 within the bore 66 of the neck portion 64.

Figure 6:
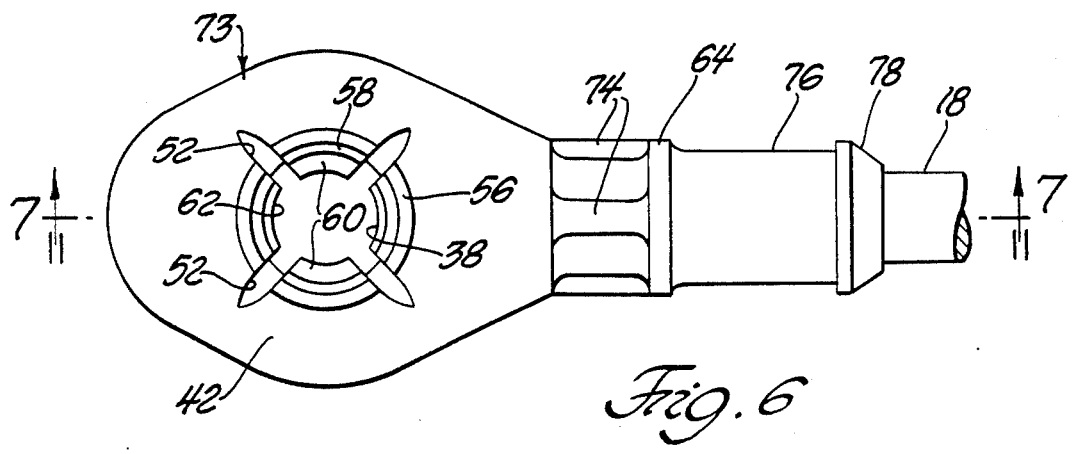
FIG. 6 is an enlarged plan view of a third embodiment of the instant invention.
Figure 7:
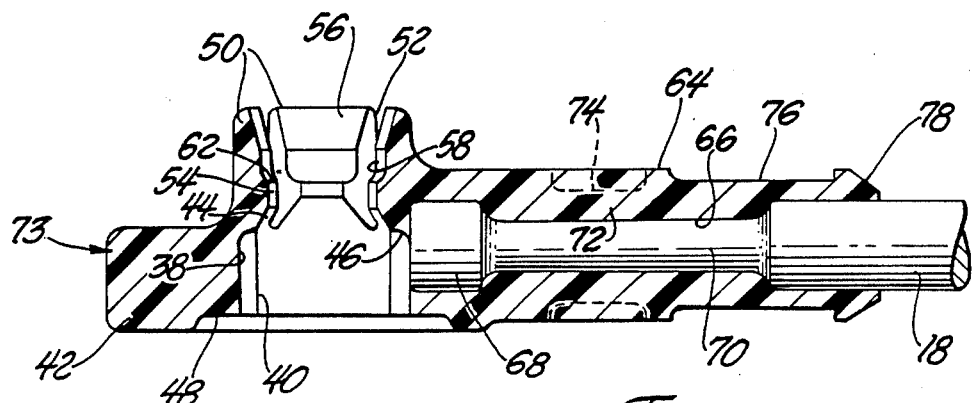
FIG. 7 is a cross-sectional view taken substantially along lines 7—7 of FIG. 6.

A second and third embodiment of the instant invention are generally indicated at 71 and 73, respectively, in FIGS. 5, 6, and 7. As shown in FIGS. 5 through 7, the neck portion 64 may include longitudinally extending ribs 74 on the outer surface thereof. The ribs 74 allow for a decrease of material disposed about the end portion 68 of the rod member 18 so as to allow for rotation of the terminal members 71 and 73 about the end portion 68 of the rod member 18.

The terminal member 71 shown in FIG. 5 includes an extended neck portion 64. The extended neck portion 64 provides a stop which abuts against the wiper 16 of the guide means 12. In operation, as the rod member 18 is drawn into the tube member 14, the neck portion 64 of the terminal member 71 abuts against the wiper 16 to limit the extent to which the rod member 18 is drawn into the tube member 14.

The terminal member 73 shown in FIGS. 6 and 7 includes an extended neck portion 64 having an annular depression 76 thereabout and an inwardly tapering end portion 78. The depression 76 and taper portion 78 allow for the application of a boot to the terminal member 73, the boot being adapted to be attached to the tube member 14. The boot isolates the rod member 18 from the surrounding environment, thereby providing further means for preventing contamination of the assembly 10 by foreign particles which would prevent the smooth linear movement of the core means.

The terminal member 20 is made from an organic polymeric material and is molded about the end portion 68 of the rod member 18.

The instant invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

The embodiments of the invention in which an exclusive property or privilege is claimed are defined as follows:

1. A motion transmitting remote control assembly (10) of the type for transmitting motion in a curved path, said assembly (10) comprising: a guide means (12); core means (18) movably supported by said guide means (12) and extending therefrom to provide a variable extending length of said core means (18) between said guide means (12) and one end (68) of said core means (18), said extending length defining a line of force; and an integral terminal member (20) for operatively interconnecting said extending length of said core means (18) and a control member (22) of the type having a body portion (32) and a smaller ball pin (36) extending therefrom, and characterized by said terminal member (20) including an enlarged base portion (42) having a neck portion (64) extending along said extending length of said core means (18) for retaining a portion of said extending length therein on said line of force, an opening (38) extending completely through said terminal member (20) on an axis perpendicular to said line of force and having a containing portion (40) on said line of force for containing the body portion (32) of the control member (22) therein and for absorbing the applied forces as said terminal member (20) is moved along the line of force, said containing portion (40) being disposed in said enlarged base portion (42) on one side thereof, said opening (38) of said terminal member (20) further including a plurality of flexible fingers (50) extending laterally from the side of said enlarged base portion (42) opposite said one side, about said containing portion (40) and offset axially with respect to said opening from said line of force and arranged about said axis of said opening (38), said fingers (50) defining lips (60,62) extending into said opening and defining a smaller diameter portion of said opening (38) than said containing portion (40) thereof, said fingers (50) extending from said base portion (42) to free distal ends for flexing radially of said axis of said opening (38) during insertion of the ball pin (36) through the smaller diameter portion of said opening (38) to retain the ball pin (36) disposed within said opening (38) independently of actuating engagement between the body portion (32) and said opening in said enlarged base portion (42) whereby the relatively smaller ball pin (36) of a control member (22) may be freely passed through the larger containing portion (40) of said opening (38) and into engagement with the smaller diameter presented by said fingers (50) to flex said fingers (50) outwardly until the ball pin (36) is therepast as the larger body portion (32) of the control member (22) which trails the ball pin (36) is inserted into said larger containing portion (40) for transmitting said applied forces therebetween while held therein by said fingers (50) engaging the ball pin (36) at a position between the body portion (32) and the ball pin (36).

2. An assembly as set forth in claim 1 further characterized by said containing portion including a substantially cylindrical portion (40) of said opening (38) for containing the body portion (32) of the control member (22) therein and for absorbing the applied forces as said terminal member (22) is moved along said line of force.

3. An assembly as set forth in claim 2 wherein the control member (22) includes a flange (34) extending from the body portion (32) thereof further characterized by said containing portion including an annular inwardly tapering portion of said opening (38) between said cylindrical portion (40) thereof and said retaining means and said containing means further including abutment means for abutting the flange (34) extending from the body portion (32) of the control member (22) to retain the body portion (32) of the control member (22) below said inwardly tapering portion.

4. An assembly as set forth in claim 3 further characterized by said inwardly tapering portion including a frustoconical portion (44) adjacent to said retaining means and an annular inwardly curving portion (46) between said frustoconical portion (44) and said cylindrical portion (40).

5. An assembly as set forth in claim 3 further characterized by said abutment means including a shoulder portion (48) disposed about a periphery of said opening (38) for abutting against the flange (34) extending from the body portion (32) of the control member (22).

6. An assembly as set forth in claim 1 further characterized by including a slot (52) formed between each of said plurality of fingers (50).

7. An assembly as set forth in claim 6 further characterized by said plurality of slots (52) extending radially into said retaining means from said axis at an angle relative to said line of force.

8. An assembly as set forth in claim 7 further characterized by each of said slots (52) being disposed at an acute angle relative to said line of force.

9. An assembly as set forth in claim 8 including four of said slots (52), each of said slots (52) being disposed at an angle of about 45° relative to said line of force.

10. An assembly as set forth in either claim 6 or 9 further characterized by said slots (52) extending completely through said plurality of fingers.

11. An assembly as set forth in claim 1 further characterized by each of said fingers including an inner surface defining a cylindrical portion (54) adjacent to said containing means and a frustoconical outer portion (56) and an intermediate portion (58) therebetween having a longitudinally inwardly sloping surface towards said cylindrical portion (54) so as to define a circumferential edge therebetween.

12. An assembly as set forth in claim 11 further characterized by each of said fingers including a lip (60) extending inwardly from said circumferential edge for engaging the ball pin (36) of a control member (22) disposed within said opening (38).

13. An assembly as set forth in claim 12 further characterized by said terminal member (20) including four slots (52) defining two outward ones of said fingers (50) longitudinally aligned with said line of force and two intermediate ones of said fingers (50) including one of said lips (60) extending into said opening (38) from said circumferential edge thereof.

* * * * *